US011251987B2

(12) United States Patent
Keohane et al.

(10) Patent No.: US 11,251,987 B2
(45) Date of Patent: Feb. 15, 2022

(54) MODIFICATION OF DEVICE SETTINGS BASED ON USER ABILITIES

(71) Applicant: International Business Machines Corporation, Armonk, NY (US)

(72) Inventors: Susann Marie Keohane, Austin, TX (US); Marc Kevin Johlic, Pinellas, FL (US); Sharon D. Snider, Seadrift, TX (US); Mary Jo Mueller, Austin, TX (US); Khwaja Jawahar Jahangir Shaik, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/579,408

(22) Filed: Sep. 23, 2019

(65) Prior Publication Data

US 2021/0091971 A1 Mar. 25, 2021

(51) Int. Cl.
*H04L 12/28* (2006.01)
*G06F 9/451* (2018.01)
*H04L 29/08* (2006.01)

(52) U.S. Cl.
CPC .......... *H04L 12/2829* (2013.01); *G06F 9/451* (2018.02); *H04L 12/2816* (2013.01); *H04L 67/125* (2013.01); *H04L 67/306* (2013.01)

(58) Field of Classification Search
CPC ............. H04L 12/2829; H04L 12/2816; H04L 67/125; H04L 67/306; G06F 9/451
USPC .......................................... 709/275; 700/275
See application file for complete search history.

(56) References Cited

U.S. PATENT DOCUMENTS

| 8,996,432 | B1* | 3/2015 | Fu .......................... G06N 20/00 706/23 |
| 9,473,321 | B1 | 10/2016 | Bazar et al. |
| 10,182,766 | B2* | 1/2019 | Fu .......................... G06F 19/00 |
| 2007/0143233 | A1 | 6/2007 | Van Doren |
| 2013/0337909 | A1* | 12/2013 | Pattison .................. A63F 13/65 463/29 |

(Continued)

OTHER PUBLICATIONS

Bempong et al., "Accessible Smart Home System for the Deaf and Hard-of-Hearing," https://www.rit.edu/ntid/nyseta/sites/rit.edu.ntid.nyseta/files/docs/fullpapers_PDFs/StanislowJoeFullPaper.pdf, printed Jun. 12, 2019, 4 pgs.

(Continued)

*Primary Examiner* — Nicholas R Taylor
*Assistant Examiner* — Chong G Kim
(74) *Attorney, Agent, or Firm* — Peter K. Suchecki (57) ABSTRACT

Provided is a method, computer program product, and system for modifying IoT device settings based on changes in user abilities. A processor may detect a plurality of IoT devices associated with one or more users. The processor may determine an ability baseline for the one or more users when interacting with the plurality of IoT devices. The processor may monitor interactions of the one or more users with the plurality of IoT devices. The processor may detect a change in the ability baseline for the one or more users when interacting with at least one IoT device of the plurality of IoT devices. In response to detecting the change, the processor may adjust one or more settings related to the at least one IoT device. The processor may propagate the adjustment to the one or more settings of the IoT device to the other IoT devices of the plurality.

18 Claims, 7 Drawing Sheets

(56) References Cited

U.S. PATENT DOCUMENTS

| | | | |
|---|---|---|---|
| 2014/0051506 A1* | 2/2014 | Ameling | G06Q 99/00 |
| | | | 463/29 |
| 2014/0098247 A1 | 4/2014 | Rao et al. | |
| 2015/0328550 A1* | 11/2015 | Herzig | A63F 13/30 |
| | | | 463/31 |
| 2016/0089606 A1* | 3/2016 | Javed Lal Mohammed | |
| | | Ameerjan | A63F 13/35 |
| | | | 463/29 |
| 2016/0359864 A1 | 12/2016 | Dhaliwal et al. | |
| 2017/0093594 A1 | 3/2017 | Peak | |
| 2017/0191693 A1 | 7/2017 | Bruhn et al. | |
| 2019/0052637 A1* | 2/2019 | Dean | H04W 12/47 |
| 2019/0200872 A1* | 7/2019 | Matsuoka | A61B 5/0013 |
| 2019/0372345 A1* | 12/2019 | Bain | G06Q 30/0601 |

OTHER PUBLICATIONS

Burnes Citadel, "Home Automation & Smart Home Technology in St. Louis," http://www.burnes-citadel.com/smart-home-technology.html, printed Jun. 12, 2019, 2 pgs.

Hughes, K. "The Challenge with Smart-Home Technology in Multifamily," http://www.multifamilyexecutive.com/technology/the-challenge-with-smart-home-technology-in-multifamily_o, printed Jun. 12, 2019, 2 pgs.

Jones, K., "Budget-Friendly Smart Home Tech for Seniors & Individuals with Special Needs—HomeAdvisor," https://www.homeadvisor.com/r/budget-friendly-smart-home-accommodations-for-seniors-and-individuals-with-special-needs/, printed Jun. 12, 2019, 12 pgs.

Montgomery, L., "Home Automation Helps Hearing Impaired Homeowner—Electronic House," https://www.electronichouse.com/home-of-the-week/home-automation-helps-hearing-impaired-home-owner/, printed Jun. 12, 2019, 2 pgs.

Unknown, "ConsumerScape 360: U.S Consumer Preferences for Smart Home Device Sales Channels by Age," https://www.idc.com/getdoc.jsp?containerId=US43685518, printed Jun. 12, 2019, 2 pgs.

Unknown, "Smart Home Data: A Golden Goose Egg or Privacy Invasion," https://www.abiresearch.com/webinars/smart-home-data-golden-goose-egg-or-privacy-invasion/, printed Jun. 12, 2019, 1 pg.

Unknown, "Worldwide Smart Home Device Forecast, 2018-2022," https://www.idc.com/getdoc.jsp?containerId=US43745218&pageType=PRINTFRIENDLY, printed Jun. 12, 2019, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

FIG. 7

MODIFICATION OF DEVICE SETTINGS BASED ON USER ABILITIES

BACKGROUND

The present disclosure relates generally to the field of Internet of Things (IoT) devices, and more specifically, to utilizing a centralized system to automatically modify IoT device settings based on detected changes in user abilities.

IoT devices have become ubiquitous in everyday life. IoT devices can be found in nearly every environment (e.g., homes, businesses, etc.). For example, many homes utilize various IoT devices such as smart speakers, smart televisions, smart thermostats, and even smart refrigerators that are connected wirelessly to the internet.

SUMMARY

Embodiments of the present disclosure include a method, computer program product, and system for modifying IoT device settings based on changes in user abilities. A processor may detect a plurality of IoT devices associated with one or more users. The processor may determine an ability baseline for the one or more users when interacting with the plurality of IoT devices. The processor may monitor interactions of the one or more users with the plurality of IoT devices. The processor may detect a change in the ability baseline for the one or more users when interacting with at least one IoT device of the plurality of IoT devices. The processor may adjust, in response to detecting the change in the ability baseline for the one or more users, one or more settings related to the at least one IoT device. The processor may propagate the adjustment to the one or more settings of the at least one IoT device to the other IoT devices of the plurality.

Embodiments of the present disclosure include a method, computer program product, and system for modifying IoT device settings based on changes in user abilities. A processor may determine an ability baseline for a user. The processor may monitor interactions of the user with the system. The processor may detect a change in the ability baseline for the user based on the monitoring the interactions of the user. The processor may adjust one or more settings related to the system in response to detecting the change in the ability baseline for the user. The processor may transmit the adjustment to the one or more settings to at least one IoT device associated with the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of Internet of Things (TOT) devices, and more particularly to utilizing a centralized system to modify IoT device settings based on detected changes in user abilities. While the present disclosure is not necessarily limited to such applications, various aspects of the disclosure may be appreciated through a discussion of various examples using this context.

IoT devices have become ubiquitous in everyday life. IoT devices can be found in nearly every environment (e.g., homes, businesses, etc.). For example, many homes utilize various IoT devices such as smart speakers, smart televisions, smart thermostats, and even smart refrigerators that are connected wirelessly to the internet. Typically, each of the IoT devices has various settings for controlling specific aspects of the device.

For example, some IoT devices may include a user interface (UI) having settings that may be altered by a user to suit their preferences. In some instances, a user may prefer larger font size or a lighter or darker contrast when viewing the UI. Some IoT devices may include other settings, such as alarm or sound settings, where the volume may be adjusted to a preferred level by the user. Typically, each IoT device has settings that must be adjusted by the user manually. Over time, the user may have to readjust settings to suit their needs. For example, a user may need to adjust font settings on their smart phone to a larger size if the user's vision has changed. In such an instance, the user may have to similarly adjust font settings for all other IoT devices that utilize text to accommodate their change in vision.

Aspects of the present disclosure relate to automatically adjusting settings of a plurality of IoT devices, collectively, based on determining changes in user abilities via a centralized system. In embodiments, a centralized system (e.g., host device) may detect a plurality of IoT devices that are associated with one or more users. For example, the system may detect various IoT devices (e.g., smart home devices and/or appliances) throughout an environment (e.g., home, business, etc.) that are wirelessly connected to the centralized system. The centralized system may be any type of device (e.g., wireless router, smart speaker, computer, etc.) that connects to the IoT devices.

The system may determine an ability baseline for one or more users when the users interact with the IoT devices. The determination of the ability baseline of each user may be performed in various ways. In some embodiments, the initial ability baseline is determined by the system by analyzing user preferences associated with the one or more users (e.g., via user profile preferences) for each respective IoT device. For example, the system may use current preference settings (e.g., volume, contrast, font size, alarm settings, etc.) on the IoT devices (e.g., smartphone, laptop/computer, internet browser/application, television (TV) volume, etc.) to determine the ability baseline. In some embodiments, the system may utilize various response metrics to determine the user's ability baseline. For example, the system may determine the average time a user takes to respond to a beeping alarm/notification of an IoT device (e.g., oven, microwave, etc.) and use this to determine the initial ability baseline of the user when interacting with the specific IoT device. In this way, the system can track how the user initially interacts with each IoT device. In some embodiments, the user's ability baseline may encompass a range of values as determined by the system. For example, the system may determine that the user prefers font sizes between 12 and 14 size font based on comparing font preferences from different IoT devices. In some embodiments, the range may include a decibel range based on varying volume preferences when the user interacts with IoT devices that emit sound.

In some embodiments, the ability baseline may be determined using a self-guided survey which presents different options (e.g., fonts, font sizes, sound levels, mobility options, background contrasts, etc.) for the user to select. In embodiments, the survey may further ask if the user is currently using any compensatory systems (e.g., hearing devices, glasses, etc.) that may affect the user's ability baseline. In embodiments, the survey may further utilize ecosystem data or profile data (e.g. social media profiles, pictures, etc.) to assess via image analysis if the individual utilizes any compensatory systems.

In some embodiments, the ability baseline may be determined by a feedback loop. For example, the system may simulate current IoT device/appliance settings to aid the user in selecting the appropriate settings for their needs via feedback loop. For example, the system may present decibel settings (e.g., ring tone option) and font sizes associated with a smart phone for the user to select according to their preferences. In some embodiments, the ability baseline for the one or more users may be determined by gamification. For example, the system may apply typical elements of game playing (e.g., point scoring, competition with others, rules of play) to determine the user's ability baseline. For example, the system may use game play to determine the user's reaction ability in response to various gaming stimuli.

Once the ability baseline is established for the one or more users, the system may monitor interactions of the one or more users with the plurality of IoT devices. For example, the system may monitor which user interacts with each IoT device, how often they interact with each IoT device, and if the user's ability baseline when interacting with each IoT device has changed over a certain time period. For example, the system may track the user's speed of action in response to IoT device/appliance alerts with respect to the individual's proximity to the IoT device/appliance. For example, the user may be in a kitchen when an oven timer goes off. The system may monitor the user with respect to the oven timer alarm to evaluate if there is any change in interaction with the device. If the system detects an increase in time difference for the user when addressing the alarm (e.g., indicating the user may not have heard the alarm because the volume is too low), the system may determine that there is a change in the user's ability baseline (e.g. slower reaction time or no reaction to the alarm).

Once the system detects a change in the ability baseline of the user, the system will automatically adjust one or more settings related to the respective IoT device. For example, if the system determines the user is not responding to the oven alarm, the system may automatically adjust the volume of the oven alarm in order for the user to hear it.

Once the system adjusts the settings of the respective IoT device, the system may propagate similar adjustment of settings (if applicable) for other IoT devices linked to the system. For example, the system may increase all volume settings on other IoT devices that have alarms similar to the oven alarm. In another example, the system may determine the user is having difficulty reading text on a UI of an IoT device (e.g., based on slower interaction data when choosing options and/or selection of incorrect options on the UI, image recognition, etc.). The system may determine the user's ability baseline has changed and automatically update UI settings. For example, the system may correlate changes in the user's ability baseline for reading text and automatically increase font size settings on the IoT device to aid the user when utilizing the UI. Once adjusted, the system may propagate the modification of the font settings to all UIs of other applicable IoT devices accordingly. In this way, the user does not have to adjust font settings on other applicable devices, rather the system will automatically perform the adjustment.

In embodiments, the system may analyze historical ability baseline data for a plurality of users in order to predict cohort needs and preference settings for successful interactions with IoT devices/appliances. For example, the system may collect historical ability baseline data for a plurality of users. The system may correlate the historical ability baseline data with adjustments of settings for a plurality of IoT devices in relation to the plurality of users. Once correlated, the system may group the plurality of users into one or more cohorts based on similar adjustment of the settings. For example, the system may group users having similar vision capabilities in a specific cohort based on successful adjustment of font settings. Once the cohort is established, font settings for new users placed in the cohort will automatically be updated accordingly.

In embodiments, the system may distinguish between users within an environment and apply appropriate settings for each applicable IoT device. For example, the system may detect that two or more users having different ability baselines are attempting to use one or more IoT devices concurrently. In response, the system may determine which ability baseline to apply using a rule determination. The rule may be based on preferential ranking or scoring. For example, the owner of the system, or head of the household may outrank one or more other users such that the system will apply the highest ranked settings to the IoT devices.

In some embodiments, the adjustment of the settings of an IoT device may be transmitted to other applicable IoT devices without the use of a centralized system (e.g., peer-to-peer, ad-hoc network, etc.). For example, rather than using a centralized system, the IoT device may monitor the interactions of the user with the IoT device itself, detect changes in the ability baseline of the user based on the interactions of the user, and adjust settings related to the IoT device based on the detected change in the ability baseline of the user. Once adjustment to the settings are made on the IoT device, the IoT device may transmit the adjustment to settings to other applicable IoT devices, such that similar adjustments to the setting of the other applicable IoT devices can be made.

The aforementioned advantages are example advantages, and not all advantages are discussed. Furthermore, embodiments of the present disclosure can exist that contain all, some, or none of the aforementioned advantages while remaining within the spirit and scope of the present disclosure.

Figure 1:
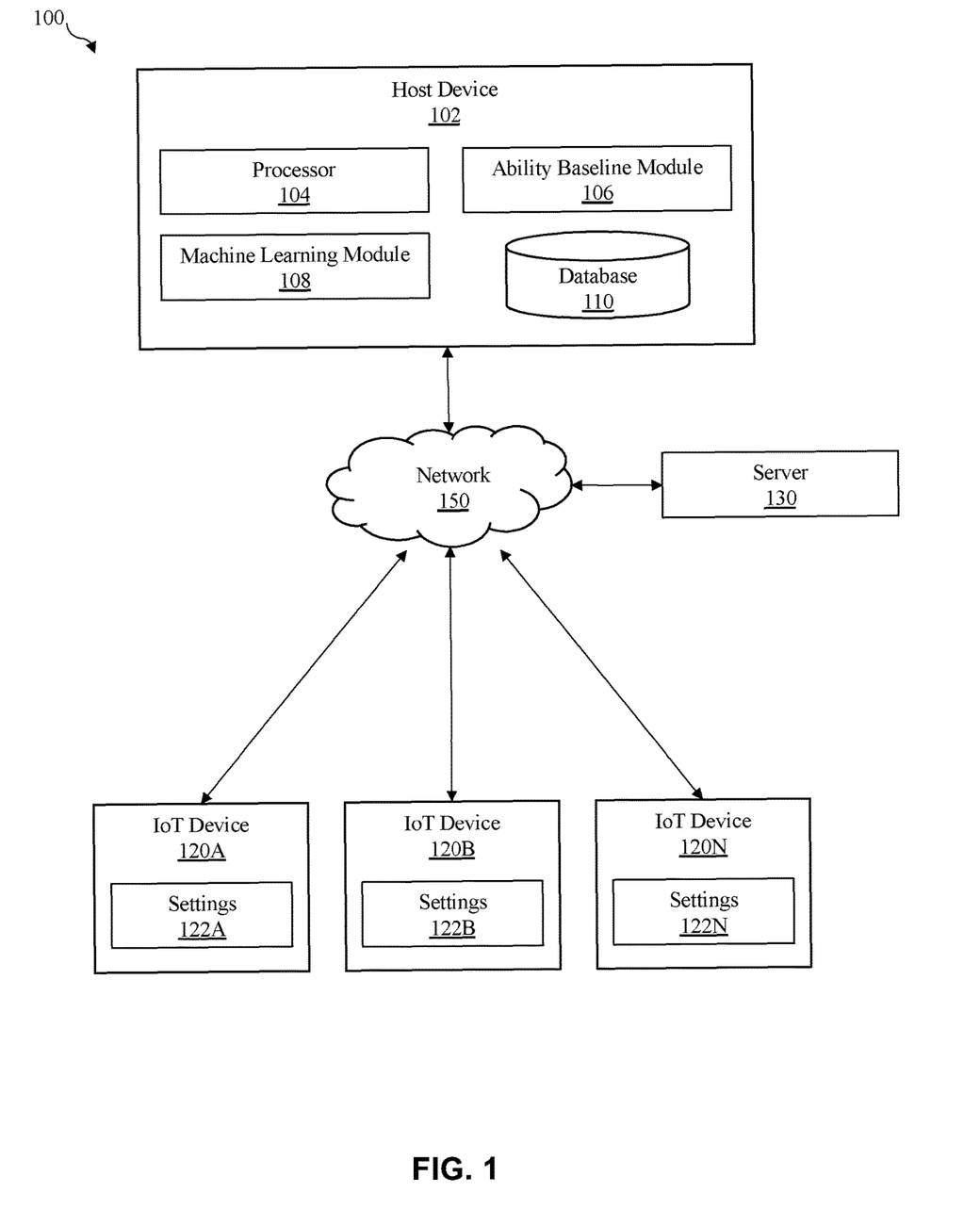
FIG. 1 illustrates a block diagram of an example system architecture, in accordance with embodiments of the present disclosure.

With reference now to FIG. 1, shown is a block diagram of an example system architecture 100, in accordance with embodiments of the present disclosure. In the illustrated embodiment, system architecture 100 includes host device 102 that is communicatively coupled to IoT device 120A, IoT device 120B, IoT device 120N (collectively referred to as IoT devices 120), and server 130 via network 150. In embodiments, IoT devices 120 may be any type of device (e.g., computer, smartphone, tablet, speaker, television, dishwasher, refrigerator, coffee maker, smart light, hearing aid, etc.) configured to communicatively connect to host device 102.

Figure 5:
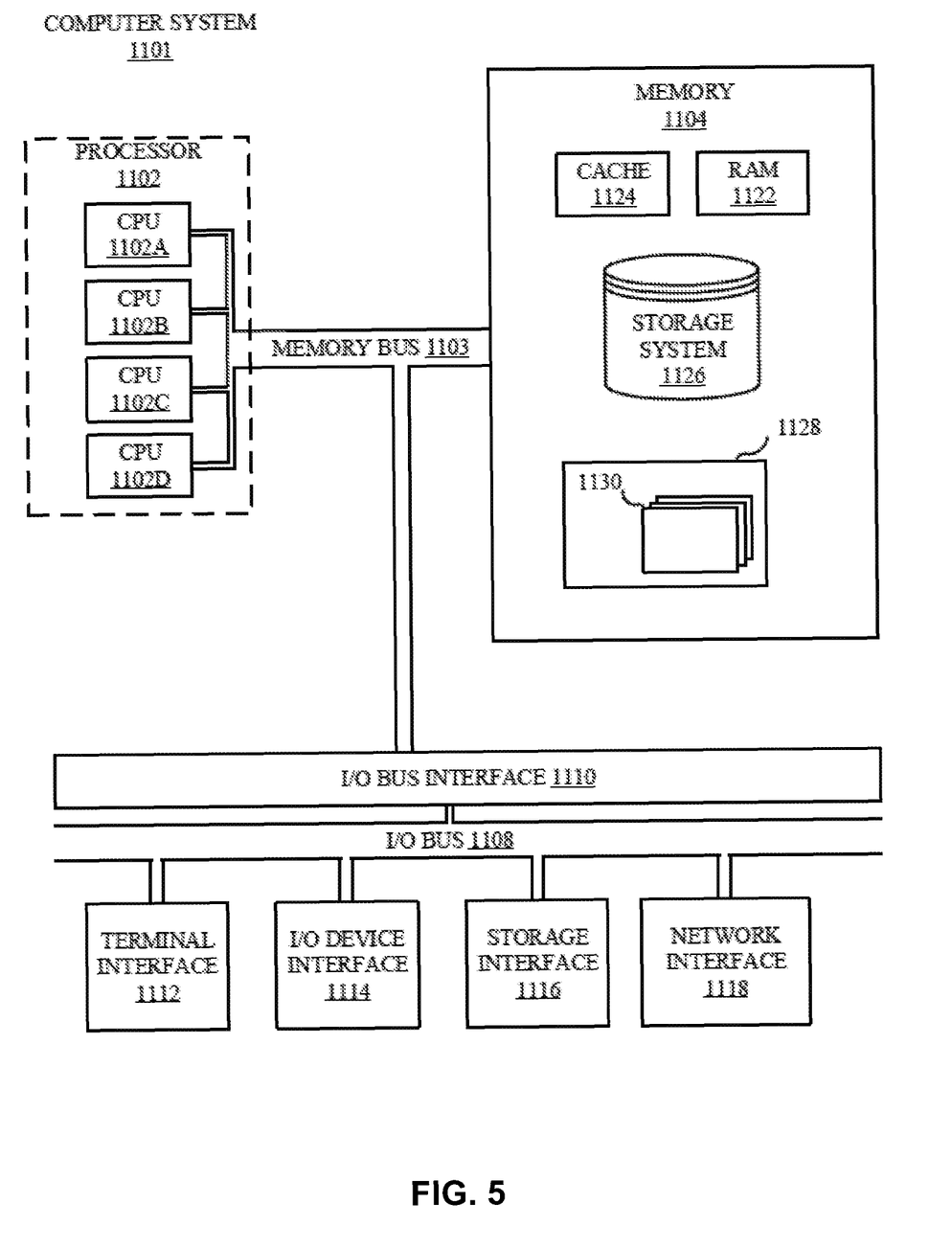
FIG. 5 illustrates a high-level block diagram of an example computer system that may be used in implementing one or more of the methods, tools, and modules, and any related functions, described herein, in accordance with embodiments of the present disclosure.

IoT devices 120 and host device 102 may be any type of computer system and may be substantially similar to computer system 1101 of FIG. 5. For example, host device 102 may be a wireless router that acts as a centralized system that communicatively couples to IoT devices 120. In another example, host device 102 may be a smart speaker that is communicatively coupled to IoT devices 120.

Network 150 may be any type of communication network, such as a wireless network or a cloud computing network. The network 150 may be substantially similar to, or the same as, cloud computing environment 50 described in FIG. 6. In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium.

For example, host device 102 may communicate with IoT devices 120 and/or server 130 using a WAN, one or more hardwire connections (e.g., an Ethernet cable) and/or wireless communication networks. In some embodiments, the various systems may be communicatively coupled using a combination of one or more networks and/or one or more local connections. For example, host device 102 may communicate with server 130 using a hardwired connection, while communication between the host device 102 and IoT devices 120 may be through a wireless communication network.

In the illustrated embodiment, host device 102 includes processor 104, ability baseline module 106, machine learning module 108, and database 110. In embodiments, host device 102 may utilize database 110 to store various user profile data and/or user preference settings pertaining to each IoT device 120. In embodiments, only user profile data pertinent to IoT devices 120 settings will be shared via an application programing interface (API) call in order to change IoT device 120 settings according to the user's preferences (e.g. increasing volume to a certain decibel, modifying fonts, adjusting contrast, limiting distractions, etc.). In embodiments, user profile data may be stored on host device 102 and/or server 130 (e.g., cloud server) and accessed using a unique key or portable device to maintain security. In embodiments, each time a user accesses system 100 or utilizes any connected IoT devices 120, the host device 102 may analyze any new user profile data and update database 110.

In the illustrated embodiment, IoT device 120A includes settings 122A, IoT device 120B includes settings 122B, and IoT device 120N includes settings 122N. The settings 122A, 122B, and 122N (collectively referred to as settings 122) may include various parameters that may be manually set by the user or automatically set by host device 102. In embodiments, IoT devices 120 are registered with host device 102 such that host device 120 can control settings 122 via API calls. In some embodiments, IoT devices 120 may include a user interface (UI). The UI may present settings 122 for adjusting: fonts on the display, color contrasts of the display, decibels of the volume for alerts, notifications (e.g., fire alarm, microwave beeping, etc.), and the like. In some embodiments, settings 122 for IoT devices 120 may include activating assistive technology (e.g., closed captioning on a television, adjusting lighting to eye sensitivity, or increasing brightness for reading when using at tablet, etc.).

In embodiments, IoT devices 120 may be any type of smart device. For example, IoT devices 120 may be configured as smart speakers, and settings 122 may be adjusted according to a user's ability baseline (e.g., a user with difficulty hearing) such that sound is localized to specific speakers which are in closest proximity to the user. In some embodiments, IoT devices 120 may be configured as wearable devices (e.g., cochlear implant, smartwatch, etc.) where settings are augmented based on user's ability baseline (e.g., increasing alert volume, etc.).

In embodiments, ability baseline module 106 is configured to determine the ability baseline for each user associated with IoT devices 120. In embodiments, ability baseline module 106 may detect settings 122 and determine the ability baseline for each user using these settings. For example, the ability baseline module 106 may track volume settings of all IoT devices 120 (e.g., smart televisions, alarms, microwaves, washers, dryers, speakers, etc.) and determine the user's ability baseline for hearing sounds using these settings. Once an initial ability baseline is determined for each user, ability baseline module 106 monitors and detects any changes in the user's ability baseline when interacting with each of the IoT device 120 over time.

For example, ability baseline module 106 may analyze voice commands of a user when interacting with IoT device 120A (e.g., a smart speaker) that request for volume settings 122A to be turned up over time. Ability baseline module 106 will detect these changes in volume settings 122A for IoT device 120A and determine there has been a change in the user's ability baseline regarding volume levels. Once determined, ability baseline module 106 will automatically update volume settings 122B and 122N in IoT device 120B (e.g., a smart television) and IoT device 120N (e.g., a smart phone), respectively.

In another example, ability baseline module 106 may detect the activation of closed captions on IoT device 120B (e.g., the smart television) and apply the changes to only IoT devices 120 that include applicable settings. For example, closed captions may be automatically enabled on a smart phone but not a smart speaker since there may be no accompanying graphical UI. In another example, ability baseline module 106 may detect changes in color/contrast and/or text size on an IoT device 120 such as a smart phone or tablet. This may indicate a change in the user's vision. Ability baseline module 106 will note the changes in the user's ability baseline and adjust the appropriate settings 122 (e.g., color/contrast, text size) of each applicable IoT device 120.

In embodiments, machine learning module 108 may comprise various machine learning engines (artificial neural network, correlation engines, reinforcement feedback learning model, supervised/unsupervised learning model, etc.) configured to analyze data generated from the system 100. For example, machine learning module 108 may analyze historical user profile data and/or historical user ability baseline data generated from the system 100 and correlate changes in settings over time for various users in order to group users into cohorts. Machine learning module 108 may group users based on similar digital environments, abilities, IoT device settings, and characteristics (e.g., demographic information, physical/cognitive ability, location, cultural information, digital environments, types of IoT devices, number of inhabitants, etc.). Machine learning module 108 may use the cohorts to predict preferences for other users based on settings for successful interactions with IoT devices/appliances. For example, machine learning module 108 may use unsupervised learning algorithms to group user's into specific cohorts, derive properties from the cohorts, and relate the properties with other or new users in order to predict the appropriate settings for successful interaction with each IoT device 120. In embodiments, machine learning module 108 may utilize a feedback learning model to collect initial user setting preferences and ability baselines for interacting with respective IoT devices to reinforce the supervised and unsupervised models. Over time, host device 102 can become more accurate in properly adjusting user settings on IoT devices 120 according to the user's changes in ability baseline.

FIG. 1 is intended to depict representative components of the example system architecture 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the example system architecture 100 may not be present, and the arrangement of components may vary.

For example, while FIG. 1 illustrates an example system architecture 100 having a single host device 102, three IoT devices 120, and a single server 130, suitable network architectures for implementing embodiments of this disclosure may include any number of host devices, IoT devices, and servers. The various models, modules, systems, and components illustrated in FIG. 1 may exist, if at all, across a plurality of host devices, IoT devices, and servers.

Figure 2:
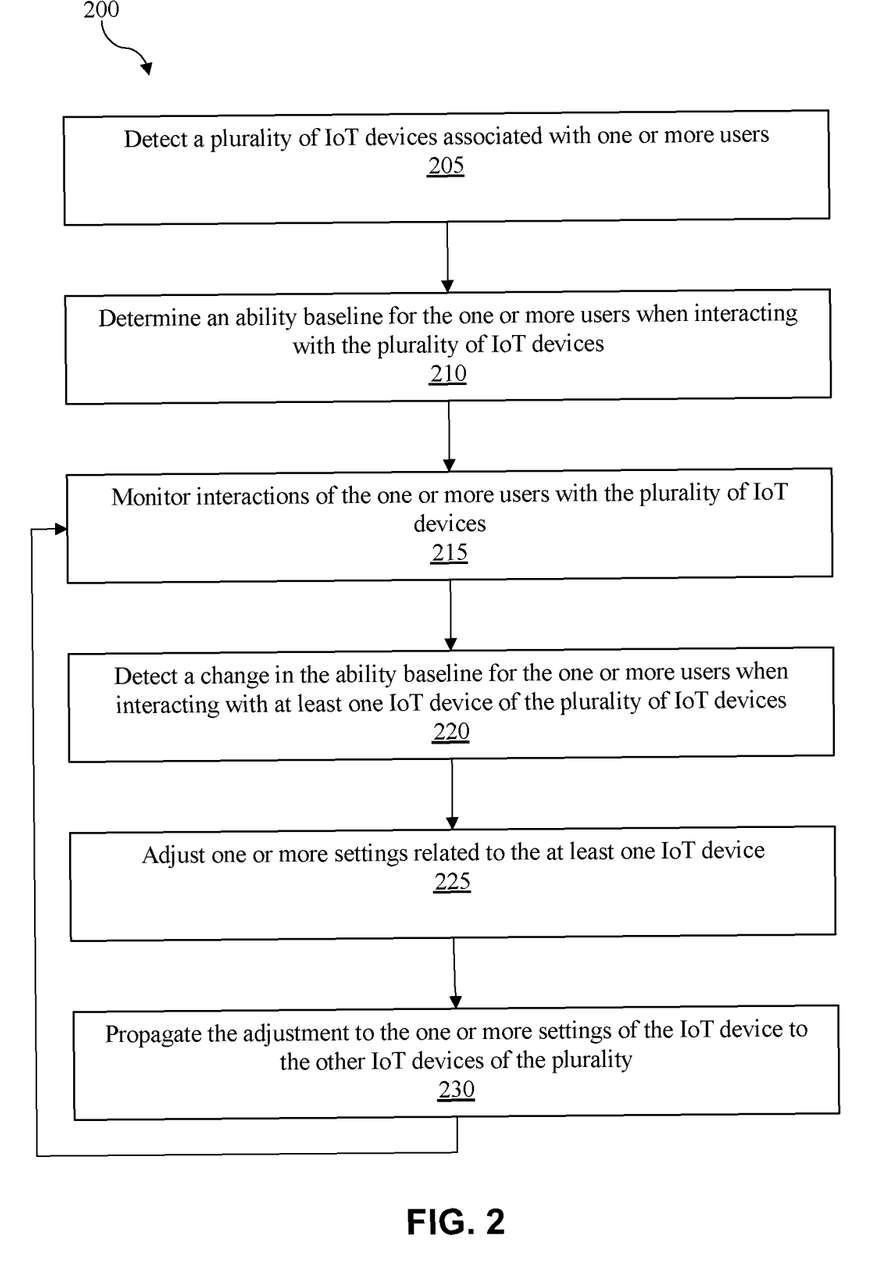
FIG. 2 illustrates a flow diagram of an example process for adjusting one or more settings of an IoT device based on change in ability baseline, in accordance with embodiments of the present disclosure.

Referring now to FIG. 2, shown is a flow diagram of an example process 200 for adjusting one or more settings of an IoT device based on change in ability baseline, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 104 exemplified in FIG. 1.

The process 200 begins by detecting a plurality of IoT devices. This is illustrated at step 205. The plurality of IoT devices 120 are associated with one or more users and communicatively coupled to host device 102. For example, host device 102 may be a wireless router that is communicative coupled to various smart devices and appliances (e.g., smart speakers, smart televisions, smart watches, smart dishwashers, smart ovens, and the like) throughout a digital environment.

The process 200 continues by determining an ability baseline for the one or more users when interacting with the plurality of IoT devices. This is illustrated at step 210. In some embodiments, the initial ability baseline is determined by analyzing user preferences associated with the one or more users for each respective IoT device. For example, the system may use current preference settings (e.g., volume, contrast, font size, alarm settings, etc.) on the IoT devices to determine the ability baseline. In some embodiments, the system may utilize various response metrics to determine the user's ability baseline. In some embodiments, the ability baseline may be determined using a self-guided survey which presents different options (e.g., fonts, font sizes, sound levels, mobility options, background contrasts, etc.) for the user to select. In embodiments, the survey may further ask if the user is currently using any compensatory systems (e.g., hearing devices, glasses, etc.). In some embodiments, the ability baseline may be determined by a feedback loop and/or gamification.

In some embodiments, once the ability baseline is determined, the initial preferences may be propagated accordingly to all applicable IoT devices connected to the system. By centralizing this process, the user is tasked to perform a minimum number of human-computer interactions.

The process 200 continues by monitoring interactions of the one or more users with the plurality of IoT devices. This is illustrated at step 215. For example, the system may monitor actions of the user with respect to each of the plurality of IoT devices. For example, the system may monitor how often the user changes settings on the IoT devices. For example, the system may monitor if the user has increased volume settings on one or more IoT devices. In some embodiments, the system may use various communicatively coupled IoT devices (e.g., sensors, cameras, etc.) to monitor user interactions with other IoT devices. For example, the system may use an IoT camera to determine a user is having difficulty reading text on the UI of an IoT device (e.g., image recognition indicating the user is holding the screen close to their face when reading).

The process 200 continues by detecting a change in the ability baseline for the one or more users when interacting with at least one IoT device of the plurality of IoT devices. This is illustrated at step 220. For example, a change in ability baseline may be detected if the user turns up the volume of the television over time. In another example, the system may determine that the user does not hear an alarm notification from an IoT device (e.g., dishwasher, microwave, smoke alarm, etc.) because the user did not acknowledge the alarm or was slower than normal when acknowledging the alarm, which may indicate a change in hearing ability baseline.

Once the system detects a change in the ability baseline of the one or more users, the process 200 continues by adjusting one or more settings for the at least one IoT device based on the change. This is illustrated at step 225. For example, the system may detect the user is having difficulty reading text on the screen of their tablet via image recognition and/or speed of interaction with the UI. The system may detect this change in ability baseline in relation to the user's eyesight and automatically increase the font size on the user's tablet.

Once the settings are adjusted on the at least one IoT device, the process 200 continues by propagating the adjustment to the one or more settings of the IoT device to the other IoT devices of the plurality. This is illustrated at step 230. Returning to the previous example, the modification of font size on the user's tablet would be propagated to any other applicable IoT devices (e.g., smart phone, computer, smart appliances throughout environment etc.) that include fonts or text on a UI.

In embodiments, the adjustments/changes to various settings may be based on the individual's proximity to the respective IoT device and/or the base level ambient noises in the room. For example, for a microwave, if the user is in another room while the microwave alarm is beeping, the system may automatically increase the volume level of the alarm as opposed to if the user was near the device in the kitchen. In another example, the system may detect background noise from a television, which may affect the user's ability baseline to hear the microwave alarm. In turn, the system may increase the volume of the alarm to compensate for the background television noise.

In another example, the system may modify which settings of each IoT device/appliance is enabled based on the user's ability baseline. For example, the system may modify certain IoT devices that use sound alarms to instead use blinking lights for a user that has difficulty hearing. For example, with smart lightbulbs and presence tracking, the IoT devices may use blinking light alarms that can follow a person throughout the home until deactivated.

In some embodiments, the change in ability baseline may be determined based on a predetermined time period. For example, the change in ability baseline may be measured during a 24-hour schedule and adjustment of settings for various IoT devices may be made accordingly. For example, a user that requires a hearing device during the day may not utilize the device while sleeping. The system may recognize the change in the user's ability baseline during the evening hours (e.g., image recognition of the user not wearing the hearing device and/or through user notification they do not wear the device at certain times during the night) and increase volume settings for various IoT device (e.g., fire alarms, smart clocks) such that the user may hear the respective devices when not wearing their hearing device.

Once the adjustments to the settings of the IoT devices are made, the process 200 may return to step 215 to monitor the interactions of the one or more users to detect any further changes in baseline ability. In this way, the system will make adjustments to the settings of the IoT device as changes in ability for the one or more users change over time.

Figure 3:
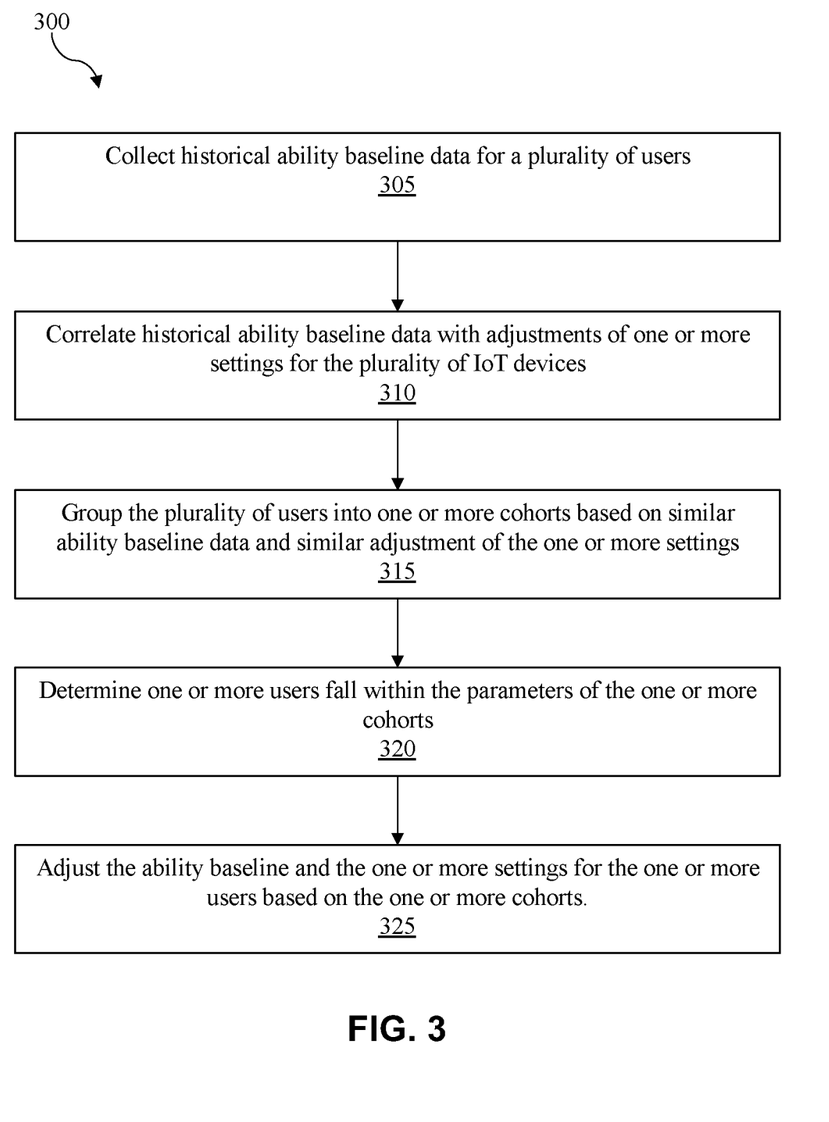
FIG. 3 illustrates a flow diagram of an example process for adjusting ability baseline of a user based on a cohort, in accordance with embodiments of the present disclosure.

Referring now to FIG. 3, shown is a flow diagram of an example process 300 for adjusting the ability baseline of a user based on a cohort, in accordance with embodiments of the present disclosure. Process 300 may be in addition to or a subset of process 200. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. The process 300 may be performed by processor 104 exemplified in FIG. 1.

The process 300 begins by collecting historical ability baseline data for a plurality of users. This is illustrated at step 305. For example, the system may collect user ability baseline data for multiple users (e.g., diversity of participants, various demographics, etc.) across multiple digital environments (e.g., systems having varying IoT devices).

The process 300 continues by correlating the historical ability baseline data with adjustments of one or more settings for the plurality of IoT devices. This is illustrated at step 310. For example, the system, using machine learning, may determine what type of setting adjustments were made for the various types of user abilities to result in successful interaction of the users with respective IoT devices. For example, the system may determine that most users having a certain vision capability could adequately see size 16 font on their computer screens.

Once the correlation is performed, the process 300 continues by grouping the plurality of users into one or more cohorts based on similar ability baseline data and similar adjustments of the one or more settings of the plurality of IoT devices. This is illustrated at step 315. The process 300 continues by determining one or more users fall within the one or more cohorts. This is illustrated at step 320. Once the appropriate cohort is determined for the one or more users, the process 300 continues by adjusting the ability baseline and the one or more settings of the IoT devices for the one or more users based on the parameters of the one or more cohorts. This is illustrated at step 325. For example, the system may group users having similar vision capabilities in a specific cohort based on successful adjustment of font settings. Once the cohort is established, font settings for new users placed in the cohort will automatically be updated accordingly.

Figure 4:
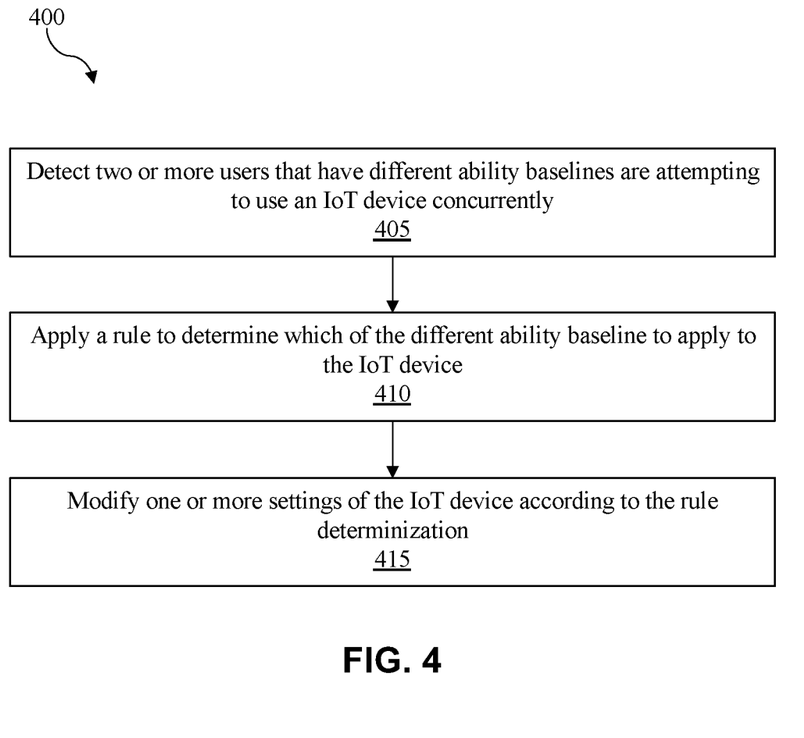
FIG. 4 illustrates a flow diagram of an example process for modifying one or more settings of an IoT device using a rule determination, in accordance with embodiments of the present disclosure.

Referring now to FIG. 4, shown is a flow diagram of an example process 400 for modifying one or more settings of an IoT device using a rule determination, in accordance with embodiments of the present disclosure. Process 400 may be in addition to or a subset of process 200. The process 400 may be performed by processing logic that comprises hardware (e.g., circuitry, dedicated logic, programmable logic, microcode, etc.), software (e.g., instructions run on a processor) firmware, or a combination thereof. In some embodiments, the process 400 is a computer-implemented process. The process 400 may be performed by processor 104 exemplified in FIG. 1.

In embodiments, the process 400 begins by detecting two or more users are attempting to use at least one IoT device of a plurality of IoT devices concurrently. This is illustrated at step 405. For multi-inhabitant spaces (e.g., homes, community centers, etc.) the system may determine which users are present in the space and negotiate preference settings of IoT devices when more than 1 individual is detected. For example, in a multi-inhabitant space, the system may determine which users are presently interacting with an IoT device (e.g., using image recognition through an IoT camera, various tracking IoT sensors, or through other user recognition means appreciated by one skilled in the art). It is assumed that the two or more users have different ability baseline settings. For example, a first user may be watching a smart television at a preferred volume (e.g., first ability baseline). A second user may enter the same area and prefer to have the volume level of the smart television at a lower volume (e.g., a second ability baseline) based on user preferences.

The process 400 continues by applying a rule to determine which of the different ability baselines to apply to the IoT device. The is illustrated at step 410. In embodiments, the system may apply any type of rule for determining which ability baseline to apply to the IoT device. For example, the system may detect the multi-inhabitants and enact a preferential voting/ranking rule for applying preference settings. For example, the first user may be identified (via user profile information) as the head of the household, while the second user is identified as a child. In such an instance, the system may determine by applying a rule determination that the first user outranks the second user, therefore, the first ability baseline will be applied to the IoT device(s).

Once the rule determination has been applied the process 400 continues by modifying the one or more settings of the IoT device according to the rule determination. This is illustrated at step 415. For example, because the first user has been determined to outrank the second user when applying the rule, the system will maintain the volume level of the smart television according to the first user's ability baseline. In some embodiments, the system may combine various ability baselines of multiple users such that the settings may accommodate all or the most users. For example, the system may lower the volume setting of the television to accommodate the second user while enabling closed captions for the first user. In some embodiments, both users may have an ability baseline that includes both a preferred volume and an acceptable range volume. If the acceptable range volumes of the users overlap, the system will adjust the volume within the acceptable range accordingly.

In embodiments, the system may prompt the users before enacting the change or alternatively may auto-enact any changes. In some embodiments, the rule determination may not be made if the system has determined the second user is not using the IoT device. For example, the second user may have been detected in the same space as the first user but has been determined not to be watching the smart television (e.g., second user is determined to be reading a book via image recognition). The system may localize person/device/appliance, then set accordingly to proximity if not affecting other inhabitants (e.g. watching tv alone even though other people are detected in home)

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200, 300, and 400).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment.

Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
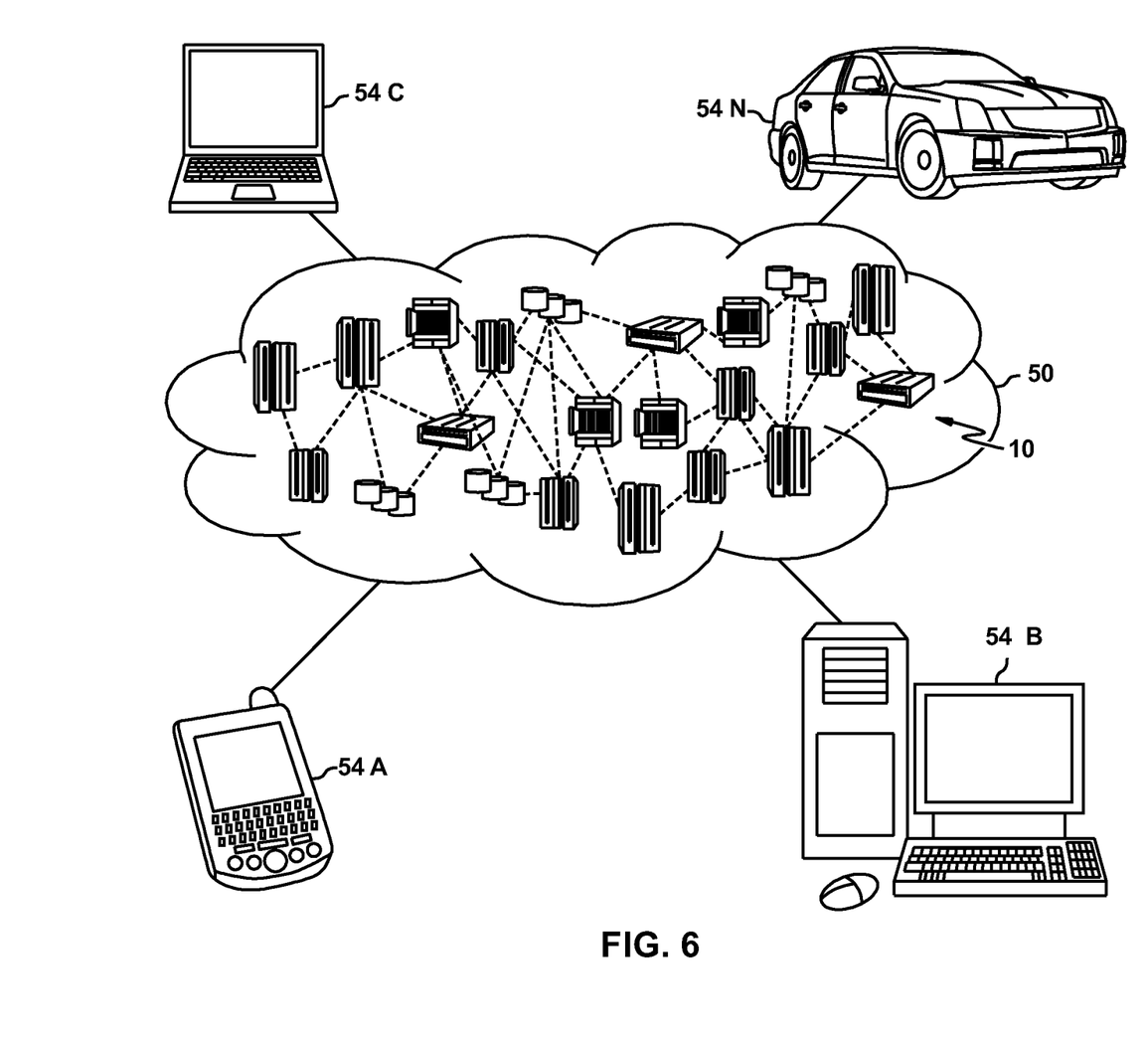
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
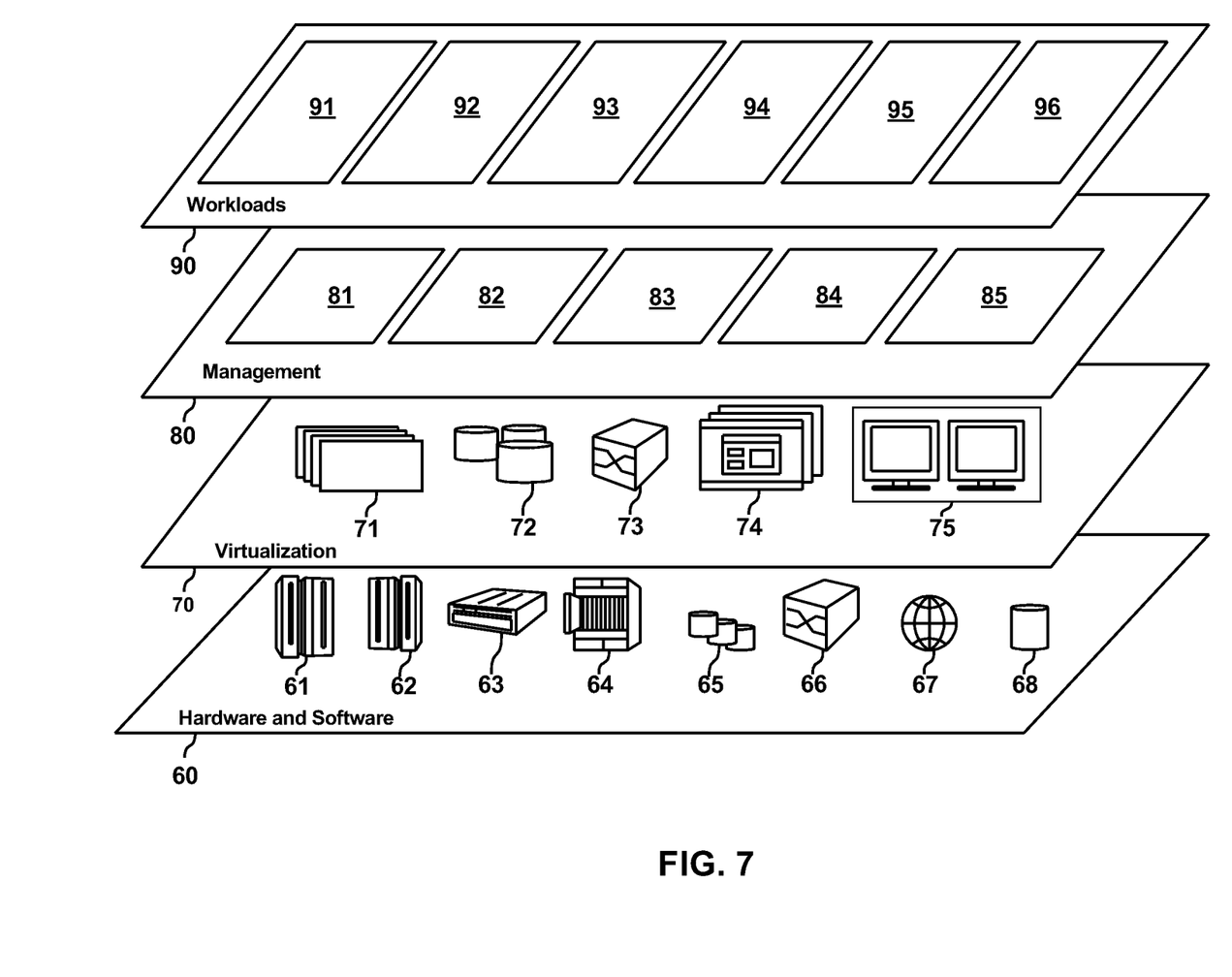
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   detecting a plurality of IoT devices, wherein the plurality of IoT devices are associated with one or more users;
   determining an ability baseline for the one or more users when interacting with the plurality of IoT devices, wherein determining the ability baseline comprises:
      measuring a response metric of the one or more users when interacting with one or more IoT devices of the plurality of IoT devices; and
      analyzing a set of answers from the one or more users in response to a questionnaire, wherein a first answer includes an indication that the one or more users uses a compensatory device, wherein the ability baseline is modified based on a type of the compensatory device;
   monitoring interactions of the one or more users with the plurality of IoT devices;
   detecting a change in the ability baseline for the one or more users when interacting with at least one IoT device of the plurality of IoT devices;
   adjusting, in response to detecting the change in the ability baseline for the one or more users, one or more settings related to the at least one IoT device; and
   propagating the adjustment to the one or more settings of the at least one IoT device to the other IoT devices of the plurality of IoT devices.

2. The computer-implemented method of claim 1, wherein the ability baseline for the one or more users is further determined, in part, by simulating the one or more settings in a feedback loop presented to the one or more users.

3. The computer-implemented method of claim 1, wherein the ability baseline is further determined, in part, by measuring game play ability of the one or more users using gamification.

4. The computer-implemented method of claim 1, wherein adjusting the one or more settings related to the at least one IoT device further comprises:
   correlating user interface settings of the at least one IoT device to the detected change in the ability baseline for the one or more users; and
   modifying, based on the correlating, the user interface settings of the at least one IoT device.

5. The computer-implemented method of claim 1, further comprising:
   collecting historical ability baseline data for a plurality of users;
   correlating the historical ability baseline data with adjustments of one or more settings for the plurality of IoT devices; and
   grouping the plurality of users into one or more cohorts based on similar ability baseline data and similar adjustments of the one or more settings of the plurality of IoT devices.

6. The computer-implemented method of claim 5, further comprising:
   determining the one or more users fall within the one or more cohorts; and
   adjusting the ability baseline and the one or more settings based on the one or more cohorts.

7. The computer-implemented method of claim 6, further comprising:
   detecting two or more users are attempting to use the at least one IoT device of the plurality of IoT devices concurrently, wherein the two or more users have different ability baselines;
   applying a rule to determine which of the different ability baselines to apply to the at least one IoT device; and
   modifying the one or more settings of the at least one IoT device according to the rule determination.

8. A system comprising:
   a processor; and
   a computer-readable storage medium communicatively coupled to the processor and storing program instructions which, when executed by the processor, cause the processor to perform a method comprising:
      determining an ability baseline for a user, wherein determining the ability baseline comprises:
         measuring a response metric of the user when interacting with the system; and
         analyzing a set of answers from the user in response to a questionnaire, wherein a first answer includes an indication that the user uses a compensatory device, wherein the ability baseline is modified based on a type of the compensatory device;
      monitoring interactions of the user with the system;
      detecting a change in the ability baseline for the user based on the monitoring;
      adjusting, in response to detecting the change in the ability baseline, one or more settings related to the system; and
      transmitting the adjustment to the one or more settings to at least one IoT device associated with the user.

9. The system of claim 8, wherein the ability baseline is further determined, in part, by measuring game play ability of the user using gamification.

10. The system of claim 8, wherein adjusting the one or more settings related to the system further comprises:
   correlating user interface settings of the system to the detected change in the ability baseline for the user; and
   modifying, based on the correlating, the user interface settings of the system.

11. The system of claim 8, wherein the method performed by the processor further comprises:
- collecting historical ability baseline data for a plurality of users;
- correlating the historical ability baseline data with adjustments of one or more settings related to the system; and
- grouping the plurality of users into one or more cohorts based on similar ability baseline data and similar adjustments of the one or more settings.

12. The system of claim 11, wherein the method performed by the processor further comprises:
- determining the user falls within the one or more cohorts; and
- adjusting the ability baseline and the one or more settings based on the one or more cohorts.

13. The system of claim 8, wherein the method performed by the processor further comprises:
- detecting two or more users are attempting to use the system concurrently, wherein the two or more users have different ability baselines;
- applying a rule to determine which of the different ability baselines to apply to the system; and
- modifying the one or more settings of the system according to the rule determination.

14. A computer program product comprising a computer-readable storage medium having program instructions embodied therewith, wherein the computer-readable storage medium is not a transitory signal per se, the program instructions executable by a processor to cause the processor to perform a method comprising:
- detecting a plurality of IoT devices, wherein the plurality of IoT devices are associated with one or more users;
- determining an ability baseline for the one or more users when interacting with the plurality of IoT devices, wherein determining the ability baseline comprises:
  - measuring a response metric of the one or more users when interacting with one or more IoT devices of the plurality of IoT devices; and
  - analyzing a set of answers from the one or more users in response to a survey, wherein a first answer includes an indication that the one or more users uses a compensatory device, wherein the ability baseline is modified based on a type of the compensatory device;
- monitoring interactions of the one or more users with the plurality of IoT devices;
- detecting a change in the ability baseline for the one or more users when interacting with at least one IoT device of the plurality of IoT devices;
- adjusting, in response to detecting the change in the ability baseline for the one or more users, one or more settings related to the at least one IoT device; and
- propagating the adjustment to the one or more settings of the at least one IoT device to the other IoT devices of the plurality of IoT devices.

15. The computer program product of claim 14, wherein the ability baseline for the one or more users is further determined, in part, by simulating the one or more settings in a feedback loop presented to the one or more users.

16. The computer program product of claim 14, wherein the method performed by the processor further comprises:
- collecting historical ability baseline data for a plurality of users;
- correlating the historical ability baseline data with adjustments of one or more settings for the plurality of IoT devices;
- grouping the plurality of users into one or more cohorts based on similar ability baseline data and similar adjustments of the one or more settings of the plurality of IoT devices;
- determining the one or more users fall within the one or more cohorts; and
- adjusting the ability baseline and the one or more settings based on the one or more cohorts.

17. The computer program product of claim 14, wherein the method performed by the processor further comprises:
- detecting two or more users are attempting to use the at least one IoT device of the plurality of IoT devices concurrently, wherein the two or more users have different ability baselines;
- applying a rule to determine which of the different ability baselines to apply to the at least one IoT device; and
- modifying the one or more settings of the at least one IoT device according to the rule determination.

18. The computer-implemented method of claim 1, wherein measuring the response metric comprises measuring an average time that the one or more users take to respond to an audible alarm.

* * * * *